United States Patent
Times-Dudley

(10) Patent No.: US 10,709,112 B1
(45) Date of Patent: Jul. 14, 2020

(54) PET WASTE COLLECTING DEVICE

(71) Applicant: Robbin Times-Dudley, Weston, FL (US)

(72) Inventor: Robbin Times-Dudley, Weston, FL (US)

( * ) Notice: Subject to any disclaimer, the term of this patent is extended or adjusted under 35 U.S.C. 154(b) by 0 days.

(21) Appl. No.: 16/658,257

(22) Filed: Oct. 21, 2019

(51) Int. Cl.
*A01K 29/00* (2006.01)
*A01K 23/00* (2006.01)

(52) U.S. Cl.
CPC .................................. *A01K 23/005* (2013.01)

(58) Field of Classification Search
CPC .... A01K 23/005; A01K 27/008; F16M 13/02; A01H 1/1206
USPC ...................... 294/1.3, 1.4, 1.5, 115; 119/867
See application file for complete search history.

(56) References Cited

U.S. PATENT DOCUMENTS

| | | | | |
|---|---|---|---|---|
| 3,738,697 A * | 6/1973 | Kahan | ..................... | B65D 75/22 294/1.4 |
| 3,744,453 A * | 7/1973 | Deitch | ................. | A01K 23/005 294/1.5 |
| 3,929,363 A * | 12/1975 | Kahan | ..................... | B65D 75/22 294/1.4 |
| 6,941,896 B1 * | 9/2005 | Morin | ................... | E01H 1/1206 119/867 |
| 7,431,361 B2 | 10/2008 | Pilas | | |
| 8,714,604 B1 * | 5/2014 | Mihalic | ................. | E01H 1/1206 294/1.4 |
| 8,939,481 B1 * | 1/2015 | Qi | ......................... | E01H 1/1206 294/1.4 |
| 2004/0066049 A1 * | 4/2004 | Azrikam | ............... | E01H 1/1206 294/1.4 |
| 2007/0194580 A1 * | 8/2007 | Raasch | ................. | E01H 1/1206 294/1.4 |
| 2009/0179441 A1 * | 7/2009 | O'Hare | ................. | E01H 1/1206 294/1.4 |
| 2009/0278366 A1 * | 11/2009 | Lipscomb | ............ | A01K 1/0114 294/1.4 |
| 2013/0062896 A1 * | 3/2013 | Ahern | .................... | A01K 29/00 294/1.4 |
| 2015/0167264 A1 * | 6/2015 | Naseem | ................ | E01H 1/1206 294/1.4 |
| 2019/0320617 A1 * | 10/2019 | Weatherly | ............ | A01K 27/004 |

* cited by examiner

*Primary Examiner* — Paul T Chin
(74) *Attorney, Agent, or Firm* — Sanchelima & Associates, P.A.; Christian Sanchelima; Jesus Sanchelima

(57) ABSTRACT

A pet waste collecting device including a telescopic shaft assembly, a dispensing assembly, a scooping assembly and a handle assembly is disclosed. The telescopic shaft assembly can be retracted or expanded for easy use by users of all heights. The dispensing assembly is mounted onto the telescopic shaft assembly and is adapted to hold a granular material therein. When necessary, the granular material held therein is released to cover the pet waste for easier collecting thereof. The dispensing assembly is adapted to expand or retract along with the telescopic shaft assembly. Importantly, the handle assembly is mounted on a distal end of the telescopic shaft assembly. On an opposite distal end of the telescopic shaft assembly the scooping assembly is mounted thereon. Upon usage of the handle assembly the scooping assembly is controlled in order to open or close the scooping assembly to collect and later dispose of pet waste.

12 Claims, 3 Drawing Sheets

PET WASTE COLLECTING DEVICE

BACKGROUND OF THE INVENTION

1. Field of the Invention

The present invention relates to a pet waste collecting device and, more particularly, to a pet waste collecting device that facilitates collecting of pet waste without the need for a user to make direct contact with the pet waste.

2. Description of the Related Art

Several designs for pet waste collecting device have been designed in the past. None of them, however, include a pet waste device comprising an elongated telescopically adjustable main body having a handle on the proximal end and a support loop for releasably maintaining a disposable bag on the distal end, wherein the main body has a hollow interior for containing a granular material. Further, there is also a handle portion that provides a trigger mechanism for releasing the granular material from the hollow portion of the main body. For responsible pet owners, there is always a need to pick up after their pets and the pet waste released by their pets. It is not a glamorous nor a desired task, but nonetheless it must be done. It is courteous to others in the surrounding area of where the pet released their waste to do so as it can otherwise result in very unpleasant odors. Hence, there is a need for a device that allows a user to collect the pet waste of their pets without the need to come in contact with the pet waste. The device of the present invention is also efficient and effective, thereby facilitating the process of collecting pet waste.

Applicant believes that a related reference corresponds to U.S. Pat. No. 7,431,361 issued to Julia Pilas for a Waste Collection Device. It includes an elongated housing having a first end and a second end. An ergonomic handle may be positioned adjacent the housing first end. A clamp assembly is coupled to the housing second end that includes a pair of hook members pivotally moveable opened and closed configurations. A disposable bag may be positioned on the hook into which a dog's waste may be collected and disposed. However, it differs from the present invention because the Pilas reference simply only collects dog waste. The present invention includes means to hold and release a granular material. Additionally, the present invention is able to collapse or expand as it includes a telescopic body which allows for comfortable use for users of all sizes. The telescopic body of the present invention also allow for quick and easy storage or transportation thereof.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pet waste scooper device that includes a telescopic body that allows for quick and easy collapsing of the present invention for quick and easy storage and transportation thereof.

It is another object of this invention to provide a pet waste scooper device that can hold and release a granular material when needed as to make picking up of pet waste easier.

It is still another object of the present invention to provide a pet waste collector device that can be used to pick up pet waste without the need for a user to make direct contact with the pet waste.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
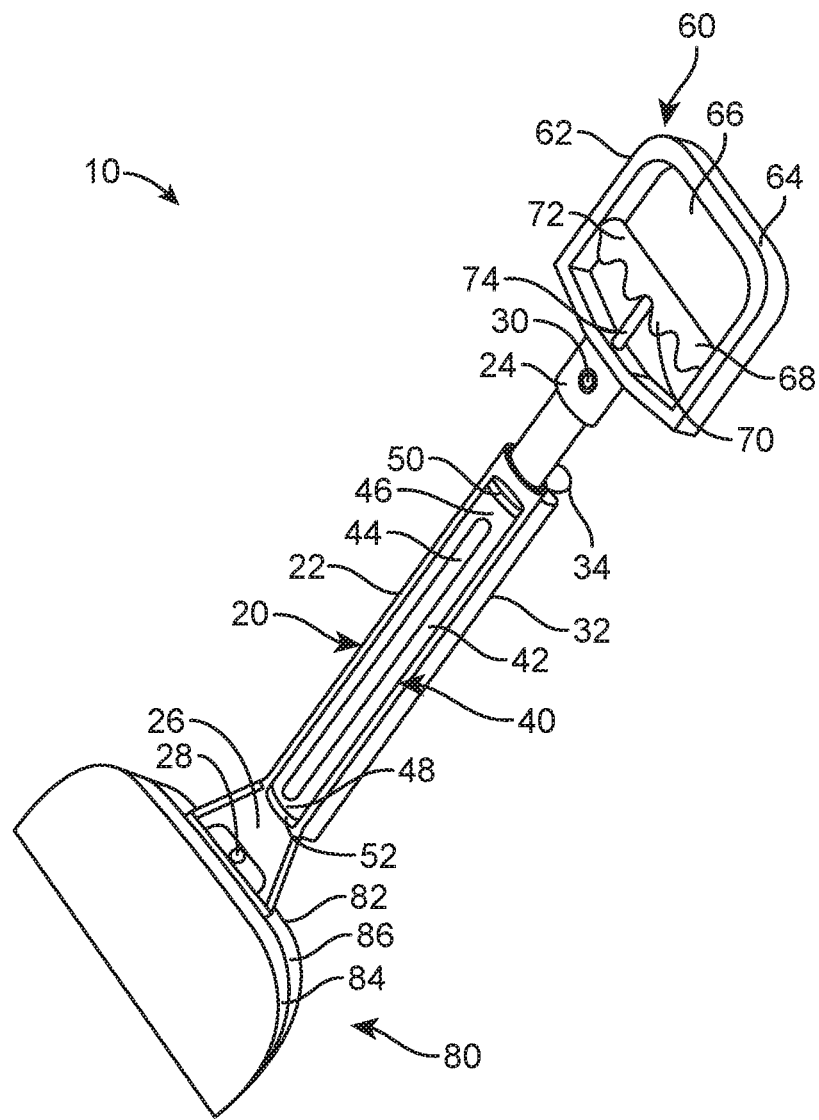
FIG. 1 represents an isometric view of the present invention in a partially collapsed configuration.

Referring now to the drawings, where the present invention is generally referred to with numeral 10, it can be observed that it, a pet waste collecting device 10, basically includes a telescopic shaft assembly 20, a dispensing assembly 40, a handle assembly 60 and a scooping assembly 80.

There is a need to collect pet waste as a responsible pet owner. Even though it is unpleasant, it is to be done. To facilitate the process of pet waste collecting the present invention may be used. It requires no direct contact with the pet waste. Instead, a user may simply gather the pet waste to later dispose of the pet waste already in a collection bag thereof.

Figure 2:
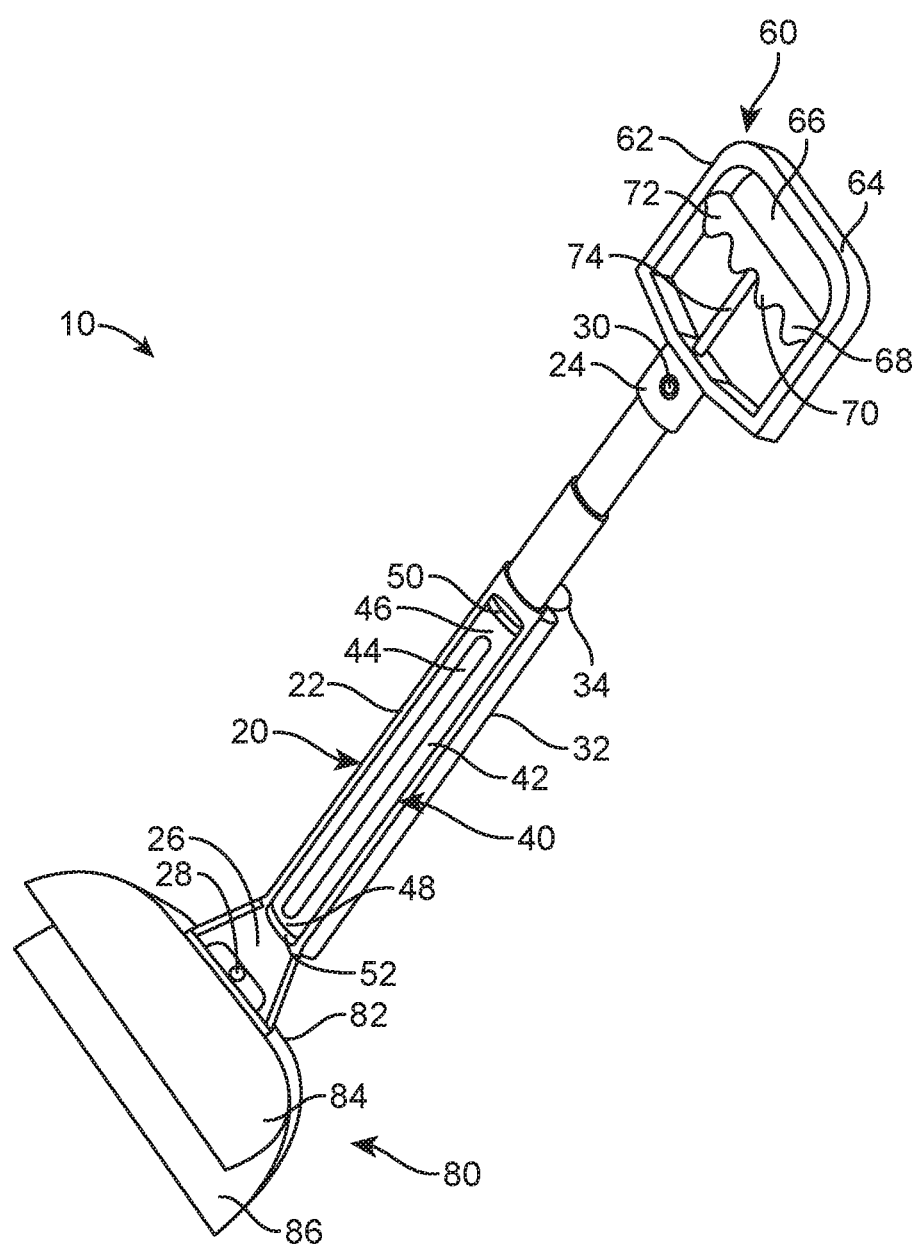
FIG. 2 shows an isometric view of the present invention in an expanded configuration.
Figure 3:
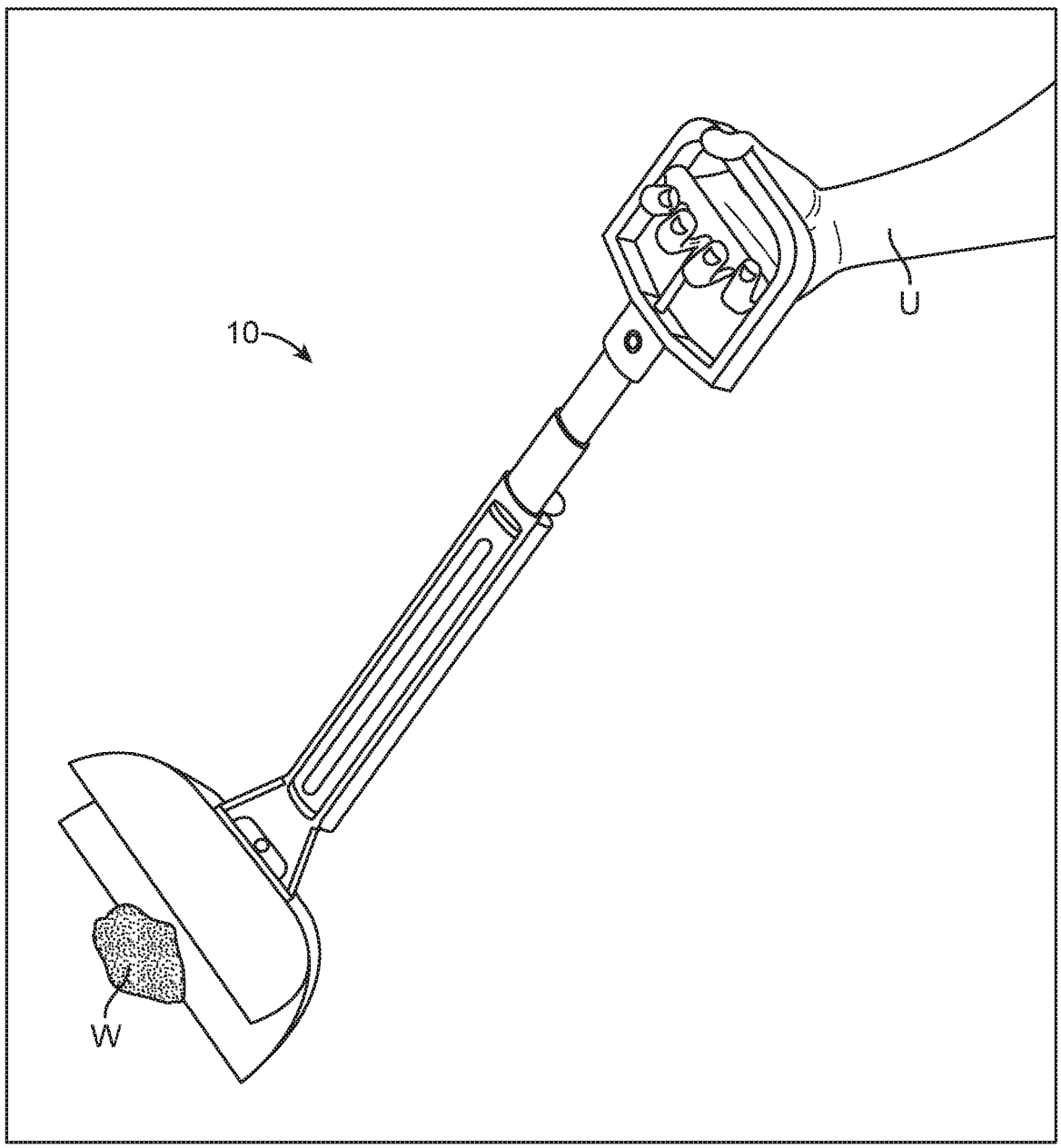
FIG. 3 illustrates the present invention in an operational setting.

Referring to FIG. 1-3, the present invention, pet waste collecting device 10 is seen. Telescopic shaft assembly 20 may be the central element of the present invention. Telescopic shaft assembly 20 may include a shaft body 22. Shaft body 22 may be telescopic in order to expand or retract per the needs of a user U. The expansion or retraction of shaft body 22 may help to comfortably accommodate the present invention for use by users of all heights and dimensions. Shaft body 22 may be substantially elongated when fully expanded. Shaft body 22 may be substantially rectangular in shape with a lower portion that tapers outwardly. In an alternate embodiment, shaft body 22 may be cylindrical. Hence, shaft body 22 may have a shape that is preferably Y-shaped. It should be understood that virtually any other shape may be suitable for shaft body 22. Additionally, in an alternate embodiment shaft body 22 may instead be of a fixed predetermined length instead of being telescopic. Shaft body 22 may further include a proximal end 24 and a distal end 26. The outwardly tapering Y-shaped portion of shaft body 22 may be located at distal end 26. At distal end 26 there may also be a light 28 mounted thereon. Light 28 may be an LED light. Light 28 may be used to illuminate the pet waste to be collected and the surrounding area of the pet waste. This helps to facilitate the collection of pet waste thereof, especially at night. In an alternative embodiment, light 28 may be mounted virtually anywhere on shaft body 22 of telescopic shaft assembly 20. Light 28 may be powered by a battery, a battery of any kind as known in the art may be suitable. In an alternative embodiment, the battery to power light 28 may be a rechargeable battery. At proximal end of shaft body may be a button 30 mounted thereon. Button 30 may be used to activate or deactivate light 28. Button 30 may be a push button in an embodiment. It may be suitable for button 30 to instead be a switch in an alternate embodiment, that is capable of activate and deactivating light 28. It may be suitable for button 30 to be mounted virtually anywhere on shaft body 22. In an alternative embodiment, it may be suitable for button 30 to be mounted virtually anywhere on pet waste collecting device 10. Telescopic shaft assembly 20 may further include a storage compartment 32 mounted thereon. Preferably, storage compartment may be mounted on an underside of shaft body 22. In an alternative embodiment, storage compartment 32 may be mounted adjacent to shaft body 22, on either a left or right side. Storage compartment 32 may be removably attached to shaft body 22. Thereby allowing user U to use the present invention in a light weight configuration that does not have a storage compartment 32 attached. Storage compartment 32 may further include a storage compartment lid 34 hingedly mounted thereon. Storage compartment lid 34 is adapted to cover an opening of storage compart 32 in order to prevent items such as bags stored therein from getting wet, for example. In an alternate embodiment, storage compartment lid 34 may be entirely removable from storage compartment 32. It should be understood that storage compartment 32 may be telescopic. In an alternative embodiment in which shaft body 22 is not telescopic, storage compartment 32 may also be non-telescopic and instead be of a fixed and predetermined length. Preferably, storage compartment 32 may be cylindrical or rectangular in shape. However, it should be understood that virtually any other shape may be suitable for storage compartment 32. Storage compartment 32 may extend along a substantial portion of storage compartment 32. In an alternative embodiment, storage compartment 32 may partially extend along a portion of shaft body 22. Storage compartment 32 may be adapted to receive, store, secure and hold bags to be used with the present invention. In an alternative embodiment, storage compartment may be an integral component of shaft body 22. Thereby meaning shaft body 22 and storage compartment may be manufactured as one whole piece.

Importantly, mounted thereon of shaft assembly 20 may be dispensing assembly 40. Dispensing assembly 40 may include a dispensing body 42. Preferably, dispensing body 42 may be rectangular or cylindrical shaped. However, it should be understood, that virtually any shape may be suitable for dispensing body 42. It should be understood that dispensing body 42 may be telescopic. In an alternate embodiment, dispensing body 42 may also be of a predetermined and fixed length. Dispensing body 42 may further be hollow. It may be suitable for dispensing body 42 to be fully hollow or partially hollow on an interior thereof. Dispensing body 42 may be used to receive, hold, storage and dispense a granular material such as pet litter or sand, for example.

Dispensing assembly 40 may also include a viewing window 44 mounted on dispensing body 42. Viewing window may extend the entire length of dispensing body 42. In an alternative embodiment, it may be suitable for viewing window 44 to only partially extend along dispensing body 42. Viewing window 44 may be virtually any shape that is elongated. In the immediate embodiment it may be oblong in shape.

Viewing window 44 may be used to view how much of materials such as granular materials, sand or litter are stored within dispensing body 42. Viewing window 44 allows user U to know when it is time to refill dispensing body 42 with the needed materials. Dispensing body 42 may further include a dispenser proximal end 46 and a dispenser distal end 48. At dispenser proximal end 46 may be a filling lid 50 mounted thereon. Filling lid 50 may be hingedly mounted onto dispensing body 42. In an alternate embodiment, filling lid may be removably mounted onto dispensing body 42. Filling lid 50 may be manually operated to allow access to the hollow interior of dispensing body 42. User U may simply remove filling lid 50 from the opening covered and fill the interior of dispensing body 42 with a suitable material such as granular material. Filling lid 50 may be of a shape that cooperates with sealing an opening located at dispenser proximal end 46. At dispenser distal end 48 may be a dispensing lid 52 mounted thereon. Dispensing lid 52 may be hingedly mounted onto dispensing body 42. In an alternate embodiment, filling lid may be removably mounted onto dispensing body 42. Dispensing lid 52 may be manually operated to allow the granular material stored inside of dispensing body 42 to be dispensed. User U may simply remove dispensing lid 52 from the opening covered and dispense the materials stored inside of dispensing body 42. Dispensing lid 52 may be of a shape that cooperates with sealing an opening located at dispenser distal end 48. The material dispense may be used to cover the pet waste to be collected, in order to allow for an easier collection of the pet waste. The material may also be used to cover the pet waste in order to reduced odors emitted by the pet waste. Once user U has dispensed a sufficient amount of material such as litter or sand, then dispensing lid 52 may be used to cover the opening from which litter or sand is being dispensed therefrom.

It can be further seen that pet waste collecting device 10 further includes a handle assembly 60. Handle assembly 60 includes a handle body 62. Handle body 62 may be square as shown in the immediate embodiment, but virtually any shape may be suitable for handle body 62. It should be understood that handle body 62 extends about a perimeter of the predetermined shape that handle body 62 may be. Thereby meaning that handle body 62 has an opening 66 therebetween the perimeter of handle body 62 as shown. A top portion 64 of handle body 62 may be adapted to receive the palm of user U. Therebetween opening 66 of handle body 62 may be a finger grip 68. Finger grip 68 may have a rod 74 mounted there below. Rod 74 may extend from underneath of finger grip 68 therethrough telescopic shaft assembly 20 up until scooping assembly 80 is reached. Finger grip 68 may have grooves 70 protruding downwardly. Finger grip 68 may have a smooth top surface 72 on an opposite end of grooves 70. Smooth top surface may simply extend to the peripheral inner sides of handle body 62. Spacing therebetween of grooves 70 may be adapted to receive the fingers of user U to allow for operating of the present invention. Shape and size of grooves 70 may be of a shape and size that cooperates with receiving the fingers of user U thereon. In an alternate embodiment, grooves 70 may instead be replaced by smooth top surface 72 to allow receiving of fingers thereon for pulling of finger grip 68 and rod 74. User U may grip finger grip 68 and pull it towards top portion 64 of handle body 62 along with rod 74 to operate the scooping assembly 80. Pulling of finger grip 68 may cause scooping assembly 80 to be in an opened configuration. While releasing of finger grip 68 may cause scooping assembly 80 to be in a closed configuration. When finger grip 68 is in a resting position, scooping assembly 80 may also be in a closed configuration.

It can further be seen that pet waste collecting device 10 includes scooping assembly 80. Scooping assembly 80 may be adapted to receive a bag from storage compartment 32, such as a trash bag therein. With a bag therein scooping assembly 80, pet waste can be collected, gathered and held therein. Scooping assembly 80 may include a scooper 82. Scooper 82 may taper in width, meaning scooper 82 may be thicker near the top and thinner near the bottom. Scooper 82 may further include a first claw 84 and a second claw 86. Scooper 82 may be semicircular shape in a preferred embodiment, meaning each of first claw 84 and second claw 86 may be semicircular shaped. However, it should be understood that any shape may be suitable for scooper 82. Scooper 82 may have an open and a closed configuration. In the open configuration first claw 84 and second claw 86 may be separated at an end at which first claw 82 and second claw 84 are thinner. In order to open and close scooper 82 and thereby each of first claw 84 and second claw 86, finger grip 68 needs to be operated. Finger grip 86 is pulled towards top portion 64 of handle body 62, which in turn pulls rod 74 towards top portion 64 of handle body 62 as well. The pulling of rod 74 by pulling on finger grip 68 results in scooper 82 and more specifically, first claw 84 and second claw 86 being operated and controlled. When finger grip 68 is in a resting position or untouched, scooper 82 and each of first claw 84 and second claw 86 are in a closed configuration. While finger grip 68 is moved towards top portion 64 of handle body 62 along with rod 74 then scooper 82 and each of first claw 84 and second claw 86 is in an opened configuration. In the open configuration, user U may collect and pick up pet waste W without the need to make direct contact with pet waste W. It should be understood that the present invention may be made of any suitable, dimensions, materials, or shapes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for pet waste collecting, comprising:
   a. a telescopic pet waste assembly including a shaft body being telescopic and having a proximal end and distal end, said telescopic pet waste assembly further including a light at said distal end of said shaft body and a button located at said proximal end adapted to activate and deactivate said light upon pressing thereof said button;
   b. a storage compartment mounted to said shaft body, said storage compartment includes a storage compartment lid mounted thereon, said storage compartment adapted to receive and hold bags therein;
   c. a dispensing assembly including a dispensing body being hollow adapted to receive and hold granular material therein, said dispensing body having a filling lid hingedly mounted at a dispenser proximal end of said dispensing body and a dispensing lid hingedly mounted at a dispenser distal end of said dispensing body, said dispensing body further including a viewing window adapted to allow viewing of amounts of said granular materials stored therein said dispensing body;
   d. a scooping assembly having a scooper, said scooper having a first claw and a second claw; and
   e. a handle assembly including a handle body having a top portion and an opening therebetween, said handle assembly further including a finger grip mounted therebetween said opening of said handle body, said finger grip including grips adapted to receive the fingers of a user and a smooth top surface, said handle assembly having a rod mounted to said finger grip, said rod extending from said finger grip on one end therethrough telescopic shaft and mounted to said scooping assembly on an opposite end, said finger grip and said rod adapted to open and close said scooper, said scooper is opened upon said finger grip, more specifically said smooth top surface, and said rod being pulled towards said top portion of said handle body.

2. The system of claim 1, wherein said shaft body is elongated and substantially cylindrical or rectangular in shape.

3. The system of claim 1, wherein said shaft body is tapered towards said distal end, said shaft body tapering outwardly.

4. The system of claim 1, wherein said light is a LED light.

5. The system of claim 1, wherein said storage compartment is removably mounted to said shaft body.

6. The system of claim 1, wherein said storage compartment is telescopic.

7. The system of claim 1, wherein said storage compartment is elongated and substantially cylindrical or rectangular in shape.

8. The system of claim 1, wherein said dispensing body of said dispensing assembly is elongated and substantially cylindrical or rectangular in shape.

9. The system of claim 1, wherein said dispensing assembly is telescopic.

10. The system of claim 1, wherein said scooper is semicircular shaped.

11. The system of claim 1, wherein said scooper has an open and a closed configuration.

12. The system of claim 1, wherein said scooper is in an open configuration when said first claw and said second claw are separated at one end.

\* \* \* \* \*